United States Patent
Na et al.

(10) Patent No.: US 7,064,989 B2
(45) Date of Patent: Jun. 20, 2006

(54) ON-DIE TERMINATION CONTROL CIRCUIT AND METHOD OF GENERATING ON-DIE TERMINATION CONTROL SIGNAL

(75) Inventors: Gwang Jin Na, Anyang-Shi (KR); Young Bae Choi, Suwon-Shi (KR)

(73) Assignee: Hynix Semiconductor Inc., Kyungki-Do (KR)

( * ) Notice: Subject to any disclaimer, the term of this patent is extended or adjusted under 35 U.S.C. 154(b) by 43 days.

(21) Appl. No.: 10/879,386

(22) Filed: Jun. 29, 2004

(65) Prior Publication Data
US 2005/0231230 A1  Oct. 20, 2005

(30) Foreign Application Priority Data
Apr. 20, 2004  (KR) .................... 10-2004-0027098

(51) Int. Cl.
*G11C 7/00*  (2006.01)
(52) U.S. Cl. .................. 365/193; 365/189.08; 365/191
(58) Field of Classification Search ............. 365/193
See application file for complete search history.

(56) References Cited

U.S. PATENT DOCUMENTS

| 2004/0141391 A1* | 7/2004 | Lee et al. .................... 365/200 |
| 2004/0228196 A1* | 11/2004 | Kwak et al. ........... 365/230.03 |
| 2005/0134303 A1* | 6/2005 | Best et al. ..................... 326/30 |

* cited by examiner

*Primary Examiner*—Amir Zarabian
*Assistant Examiner*—Kretelia Graham
(74) *Attorney, Agent, or Firm*—Marshall, Gerstein & Borun LLP

(57) ABSTRACT

Provided is directed to an on-die termination control circuit and a method for generating an on-die termination control signal, and the circuit and the method are capable of performing an optimized termination operation during data input and output, by generating a control signal during read and write operations and then controlling the termination circuit to differentiate an impedance of the termination circuit.

12 Claims, 5 Drawing Sheets

ON-DIE TERMINATION CONTROL CIRCUIT AND METHOD OF GENERATING ON-DIE TERMINATION CONTROL SIGNAL

This application relies for priority upon Korean Patent Application No. 2004-0027098 filed on Apr. 20, 2004, the contents of which are herein incorporated by reference in their entirety.

BACKGROUND

1. Field of the Invention

The present invention relates to an on-die termination control circuit and a method of generating an on-die termination control signal, and more particularly to, an on-die termination control circuit and a method of generating an on-die termination control signal to differentiate an impedance of the on-die termination circuit during a write mode and a read mode.

2. Discussion of Related Art

Since an operation of a semiconductor device gets high-speed, a swing width of interface between semiconductor devices has been shortened. It is for minimizing a delay time taken by transferring a signal. However, the narrower the swing width is, the more an influence from an external noise is increased, and also a reflection of a signal according to an impedance mismatching gets more critical in an interface terminal. The impedance mismatching is caused by an external noise, a variation of a power source voltage, a variation of operating temperature, or a variation of a manufacturing process. When the impedance mismatching occurs, it is difficult to transfer a data in a high speed and it causes to distort an output data outputted from an output terminal of the semiconductor device. Therefore, when a semiconductor device of a receiver receives the distorted output data into an input terminal, it can frequently cause those problems such as setup/hold time failure or mismatch of an input level.

Accordingly, a semiconductor device requiring high speed operation employs an impedance matching circuit, which is referred as to an on-chip termination or an on-die termination, near around a pad of an integration circuit chip.

A part of semiconductor memory devices, such as a DDR Double Data Rate SDRAM among semiconductor devices, has employed a termination circuit which is embodied with a resistor with values of resistance.

FIG. 1 is a schematic diagram illustrating a conventional termination circuit.

Referring to FIG. 1, a termination circuit is generally connected to an input/output pad PD100 and performs a role as a resistor during turn-on state, by including a pull-up transistor P100 and a pull-down transistor N100. Here, the pull-up transistor P100 is connected between a power source voltage VDDQ terminal and the input/output pad PD100, and the pull-down transistor N100 is connected between a ground terminal and the input/output pad PD100. Here, if the termination circuit is designed to perform a termination operation of 60Ω, each of the pull-up transistor P100 and the pull-down transistor N100 is available to get 120Ω for values of an on-resistance. The pull-up transistor P100 is operated by a pull-up control signal PB and the pull-down transistor N100 is operated by a pull-down control signal NB, to output data through the input/output pad PD100.

On the other hand, when the data is inputted to the input/output pad PD100, the data is inputted into an internal circuit through a buffer B100. In this case, the conventional termination circuit only gets a value of an on-resistance by setting, which makes various termination operations according to variations of receiving conditions more difficult. Especially, in case of GDDRIII, because a required impedance differentiates during a data output and during a data input, when the termination is pre-set with a default value, it isn't possible to perform an adaptable termination operation.

As a result, in order to adaptively perform an optimized termination operation, it has been necessary to improve an on-die termination technique which can change the impedance according to an operating mode, in a high speed semiconductor device.

SUMMARY OF THE INVENTION

The present invention is directed to provide an on-die termination control circuit and a method of generating an on-die termination control signal which can improve operation characteristics of a circuit by means of making an optimized termination operation possible during data output or input, by generating a control signal during read and write operation and then controlling the termination circuit for differentiating an impedance of the circuit.

One aspect of the present invention is to provide an on-die termination circuit according to an embodiment of the present invention, including: an output enable signal generator for sequentially generating output enable signals of a single pulse by a predetermined interval; an output enable signal selector for outputting two signals among the output enable signals as first and second selected signals according to a column address strobe (CAS) latency; and a termination control signal generator for generating termination control signals which have different levels for read and write operations, respectively, according to the first and second selected signals.

The output enable signal generator generates an output enable signal with a pulse width of two cycles in every one cycle.

The output enable signal selector selects two output enable signals having two cycles of generating interval among the output enable signals and then outputs them as the first and second selected signals.

The output enable signal generator includes: a first selector for outputting one of the output enable signals as the first selected signal according to CAS Latency; a second selector for outputting an output enable signal by two cycles faster than the output enable signal which is outputted from the first selector according to the CAS Latency, as the second selected signal.

The termination control signal generator includes: a logic unit for outputting a high level signal which the first selected signal, or the second selected signal are high level; a delay unit for synchronizing an output signal of the logic unit with an internal clock signal; and a buffer unit for outputting an output signal of the delay unit as a termination control signal.

Here, the logic unit includes: a first inverter for inverting the first selected signal; a second inverter for inverting the second selected signal; and a NAND gate for reciving output signals of the first and second inverters.

The delay unit may be embodied by a D flip-flop outputting an output signal of the logic unit according to the internal clock signal.

The buffer unit includes a reverse delay means.

Another aspect of the present invention is to provide a method of generating an on-die termination control signal according to an embodiment of the present invention including the steps of: selecting two output enable signals, each having two-clock cycle interval, according to the CAS latency among the output enable signals of a single pulse which are sequentially generated to have a predetermined interval from an output enable signal generator; and generating termination control signals which have different levels for the read operation and the write operation according to the two output enable signals.

In the aforementioned description, the termination control signal is generated to low level at a period that at least one of the two output enable signals is high level.

Moreover, the termination control signal is generated to low level from a preamble period to a postamble period of a data strobe signal which is related to a read operation.

BRIEF DESCRIPTION OF THE DRAWINGS

A more complete understanding of the present invention may be had by reference to the following description when taken in conjunction with the accompanying drawings in which.

DETAILED DESCRIPTION OF PREFERRED EMBODIMENTS

Figure 1:
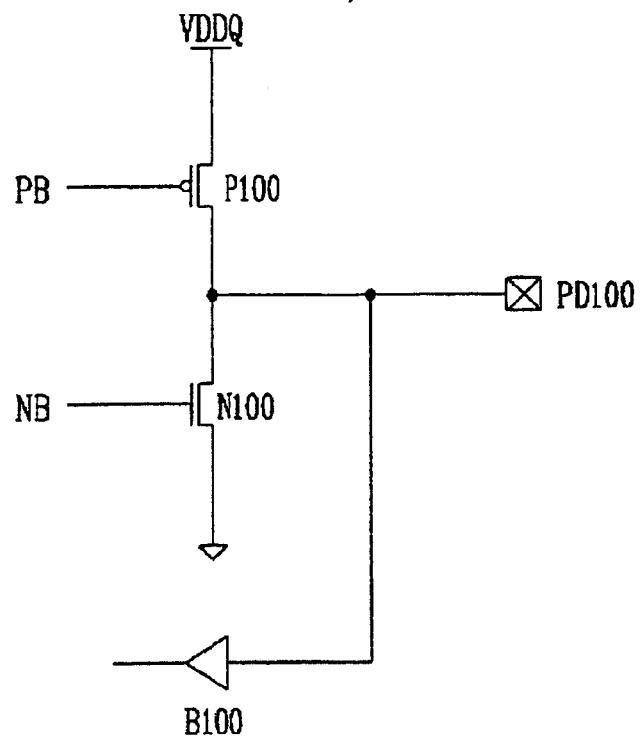
FIG. 1 is a schematic diagram illustrating a conventional termination circuit.

Hereinafter, it will be described about preferred embodiments of the present invention in detail with reference to the accompanying drawings. Wherever possible, the same reference numerals will be used throughout the drawings and the description to refer to the same or like parts.

Figure 2:
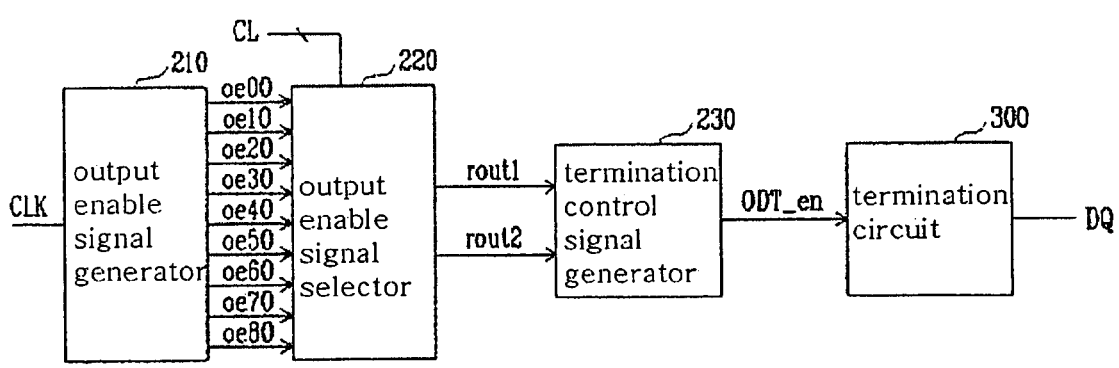
FIG. 2 is a circuit diagram illustrating structures and operations of an on-die termination enable signal generating circuit according to an embodiment of the present invention.

FIG. 2 is a circuit diagram for illustrating structures or operations of an on-die termination enable signal generating circuit according to an embodiment of the present invention.

Referring to FIG. 2, the on-die termination enable signal generating circuit of the present invention is comprised of an output enable signal generator 210, an output enable signal selector 220, and a termination control signal generator 230.

Figure 3:
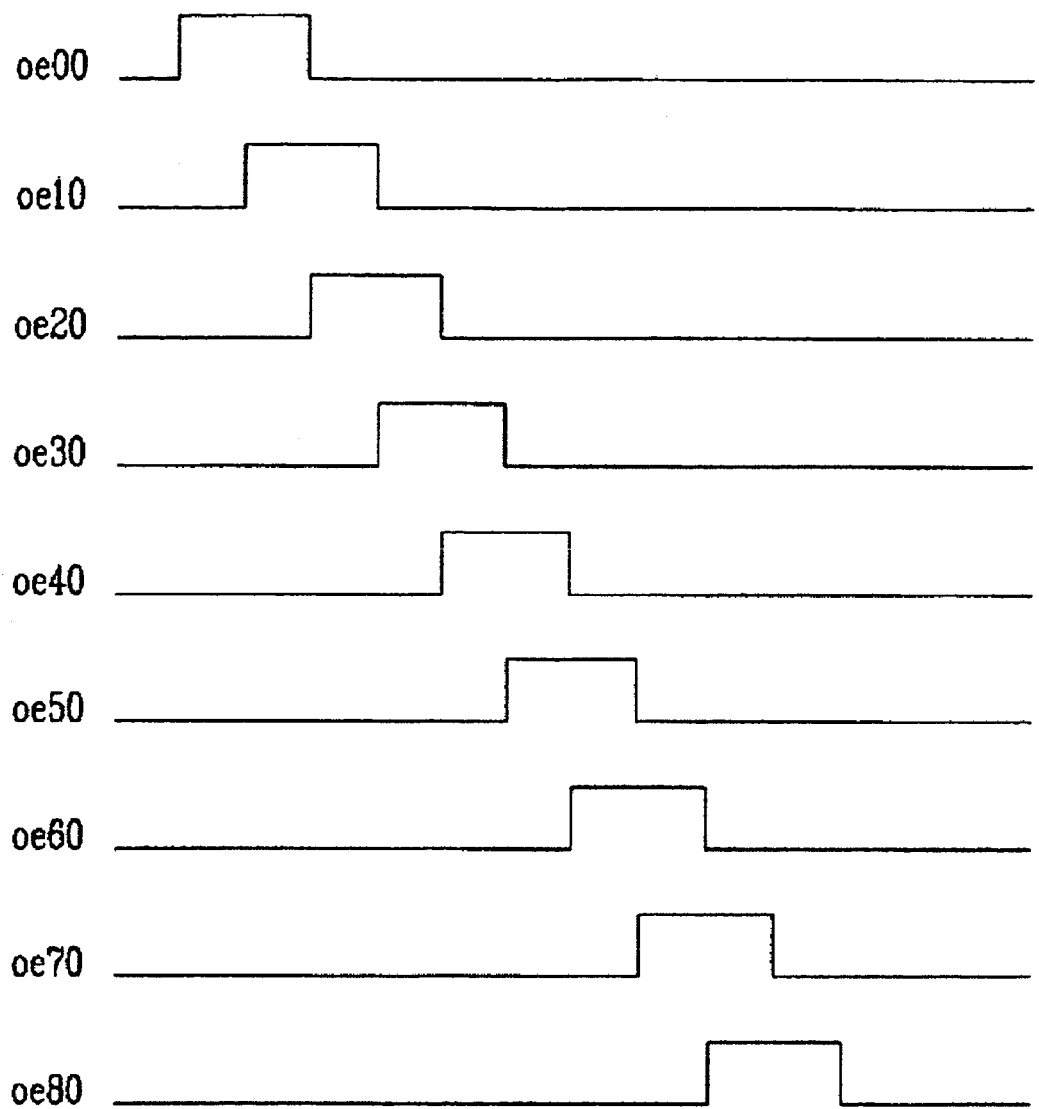
FIG. 3 is a waveform diagram illustrating an output signal of an output enable signal generator as shown in FIG. 2.

The output enable signal generator 210 generates a plurality of output enable signals oe00 to oe80 in response to a read command signal READ from the external in sync with a clock signal CLK. The plurality of output enable signals oe00 to oe80, as shown in FIG. 3, are successively generated with a single pulse form in every one cycle, and also generated with a width corresponding to two cycles of the clock signal CLK. The output enable signal generator 210 has been used as a general circuit.

The output enable signal selector 220 selects and then outputs specific signals according to a CAS latency CL signal among the output enable signals oe00 to oe80 generated from the output enable signal generator 210. Among the specific signals, two of first and second selected signals rout1 and rout2 are used to generate a termination control signal ODT_en.

The termination control signal generator 230 generates the termination control signal ODT_en by using the first and second selected signals rout1 and rout2 which are outputted from the output enable signal generator 220. The termination control signal ODT_en is applied to a termination circuit 300, and then an impedance of the termination circuit 300 is adjusted during read and write operations according to the termination control signal ODT_en.

Hereinafter, it will be described about operations of the on-die termination control circuit in detail according to embodiments of the present invention with reference to the accompanying detailed circuit diagrams.

Figure 4:
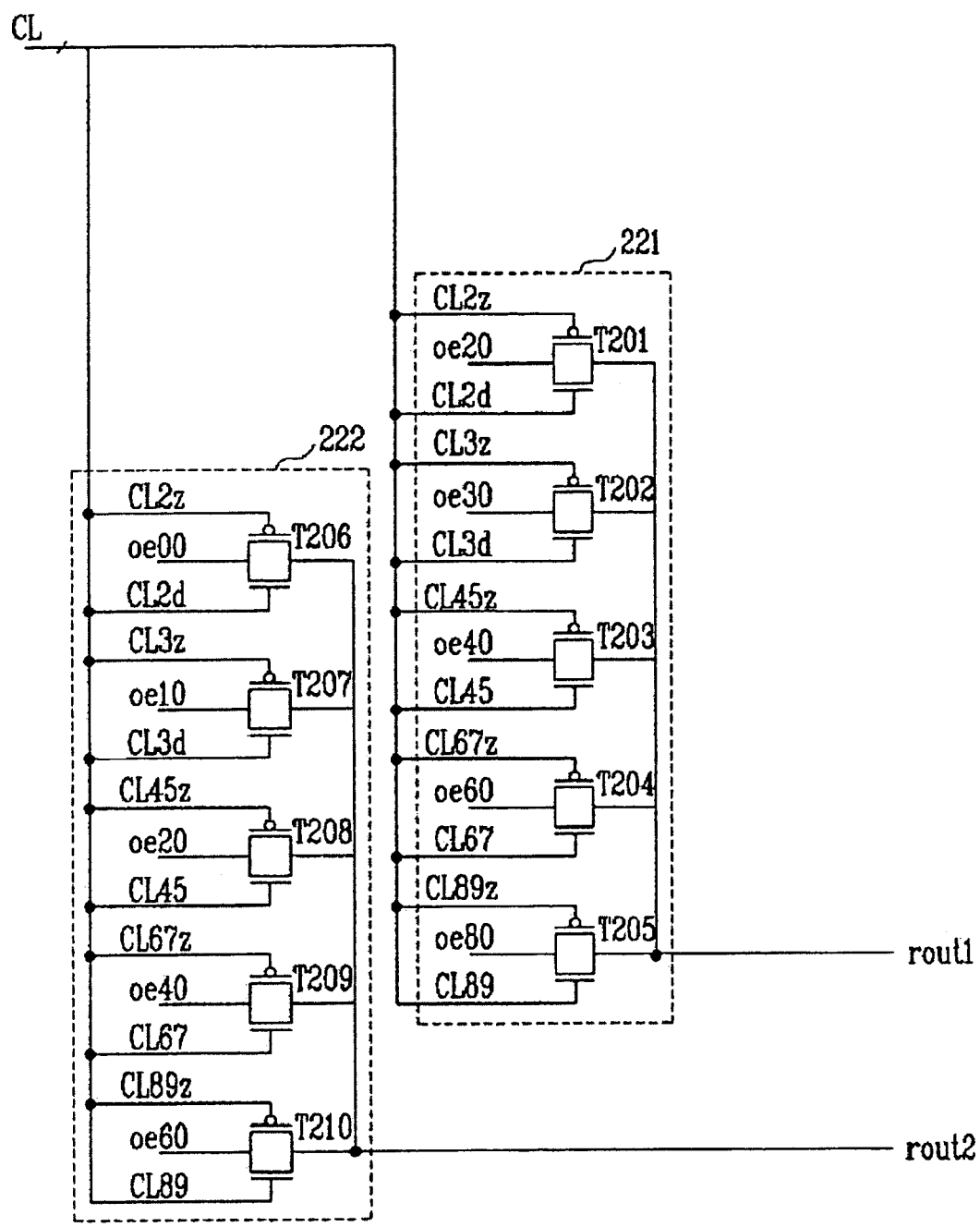
FIG. 4 is a circuit diagram illustrating structures of an output enable signal generator as shown in FIG. 2.

FIG. 4 is a circuit diagram for illustrating structures of the output enable signal selector of FIG. 2.

Referring to FIG. 4, the output enable signal selector of FIG. 2 includes first and second selectors 221 and 222. The first and second selectors 221 and 222 generates two signals selected among the plurality of output enable signals oe00 to oe80 which are generated from the output enable signal generator 210 according to a CAS latency as the first selected signal rout1 and the second selected signal rout2, respectively. During this, the output enable signal selector 220 outputs the first and second selected signals rout1 and rout2 by selecting two signals among the output enable signals oe00 to oe80 of the output enable signal generator 210, by making that each rising edge of the first and second selected signals rout1 and rout2 has two-clock cycle difference.

In order to perform it, the first and second selectors 221 and 222 are comprised of the same structure, but inputted signals for each of them are different. It will now be described about structures and operations of the first and second selector 221 and 222 in detail as follows.

The first selector 221 is comprised of five transmission gates T201 to T205 which transmit third, fourth, fifth, seventh, and ninth output enable signals, oe20, oe30, oe40, oe60, and oe80 of the output enable signal generator 210, and then outputs only one output enable signal selected by the CAS latency CL as the first selected signal rout1.

Here, the first transmission gate T201 transfers the third output enable signal oe20 according to first CAS latency signals CL2z and CL2d. The second transmission gate T202 transfers the fourth output enable signal oe30 according to second CAS latency signals CL3z and CL3d. The third transmission gate T203 transfers the fifth output enable signal oe40 according to third CAS latency signals CL45z and CL45. The fourth transmission gate T204 transfers the seventh enable signal oe60 according to fourth CAS latency signals CL67z and CL67. The fifth transmission gate T205 transfers the ninth output enable signal oe80 according to fifth CAS latency signals CL89z and CL89.

The second selector 222 is comprised of the same structure to the first selector 221, and transfers an output enable signal by two cycles faster than an output enable signal selected by the first selector 221, according to the CAS latency signal.

For instance, when the fifth CAS latency signals CL89z and CL89 are applied, the fifth transmission gate T205 is turned on of the first selector 221 of the output enable signal selector 220 and then a ninth output enable signal oe80 is outputted as the first selected signal rout1. Moreover, in the second selector 222, the tenth transmission gate T210 is turned on according to the fifth CAS latency signals CL89z and CL89, and then a seventh enable signal oe60 by two cycles faster than the eighth output enable signal oe70 is outputted.

The first and second selected signals rout1 and rout2 are applied to the termination control signal generator 230 and is used to generate the termination control signal ODT_en for controlling the termination circuit.

Hereinafter, it will be described about operations for generating the termination control signal ODT_en according to the first and second selected signals rout1 and rout2.

Figure 5:
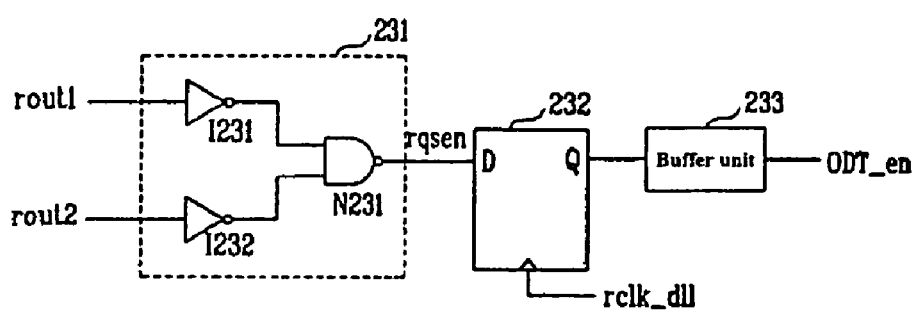
FIG. 5 is a circuit diagram illustrating structures of a termination control signal generator as shown in FIG. 2.
Figure 6:
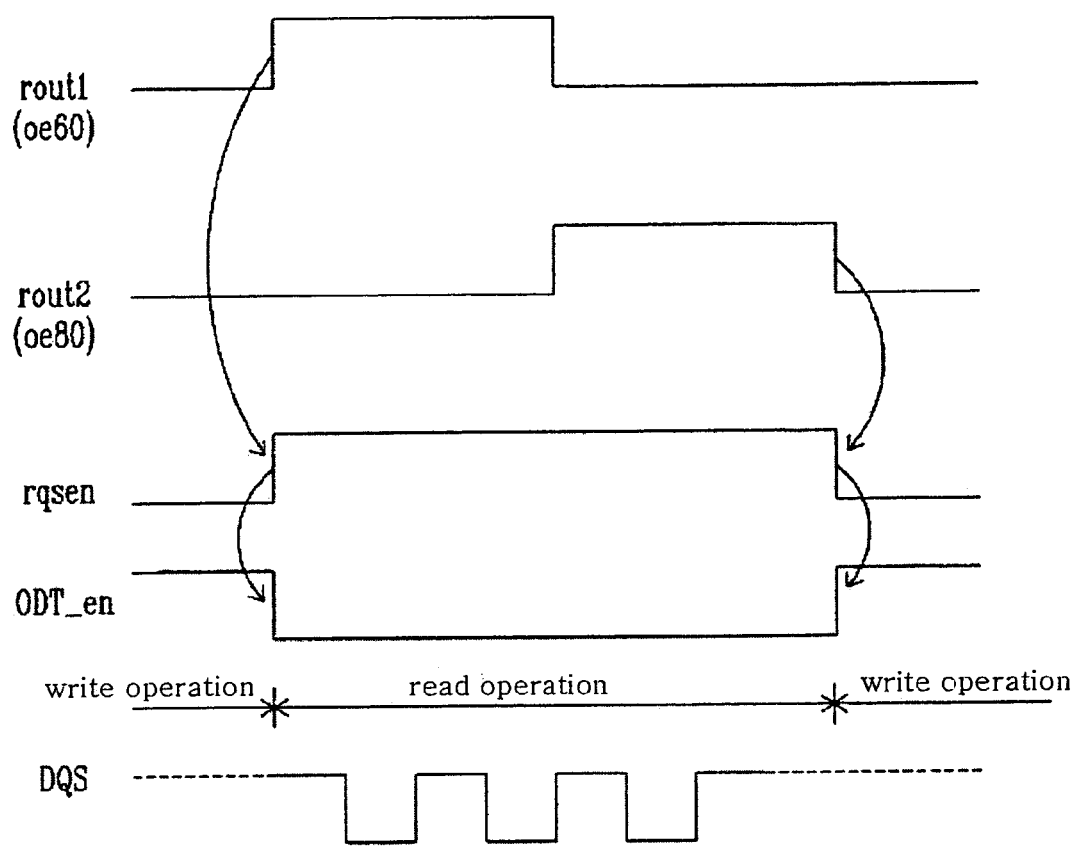
FIG. 6 is a waveform diagram illustrating operations of the termination control signal generator as shown in FIG. 2.

FIG. 5 is a circuit diagram illustrating structures of the termination control signal generator 230 in FIG. 2. FIG. 6 is a waveform diagram illustrating operations of the termination control signal generator 230 in FIG. 2.

Referring to FIG. 5, the termination control signal generator 230 includes: a logic unit 231 for outputting a high level signal, when the first and second selected signals rout1 and rout2 are high level; a delay unit 232 for delaying the output signal of the logic unit 231 by synchronizing the output signal of the logic unit 231 with the internal clock signal; and a buffer unit 233 for outputting an output signal of the delay unit 232 as the termination control signal ODT_en.

The logic unit 231 includes: a first inverter I231 for inverting the first selected signal rout1; a second inverter I232 for inverting the second selected signal rout2; and a NAND gate N231 for inputting output signals of the first and second inverters I231, I232. If at least one of the first and second selected signals maintains high level, since a combination 231 of the first and second inverters I231, I232 and the NAND gate N231 is performed as a NOR gate to output a high level signal, a signal rqsen is outputted as a form of which the first and second selected signals rout1 and rout2 are combined.

The delay unit 232 delays the output signal rqsen for synchronizing the signal rqsen outputted from the logic unit 231 with the internal clock signal rclk_d11. Here, the delay unit 232 may be embodied by a D flip-flop using the internal clock signal rclk_d11 as a clock signal. When the delay unit 232 is embodied by the D flip-flop, although the output signal rqsen is inputted, the output signal rqsen is not directly outputted but outputted at a rising edge of the internal clock signal rclk_d11. As a result, the output signal rqsen is synchronized with the internal clock signal rclk_d11. On the other hand, since the D flip-flop is changed to low level at the rising edge of the internal clock signal rclk_d11, although the output signal rqsen is changed to low level, the output signal rqsen is outputted as a form synchronized with the internal clock signal rclk_d11 with a predetermined delay time.

The buffer unit 233 is operated as a reverse delay means is, and outputs the output signal of the delay unit 232 as the termination control signal ODT_en.

When a read command is inputted, the on-die termination control circuit generates the termination control signal ODT_en to low level from the start section of the preamble to the end section of the postamble of the data strobe signal DQS, by combining two signals, which are selected among the output signals of the output enable signal generator 210 according to the CAS latency. During this, since the termination control signal ODT_en is generated by the selected signals according to the CAS latency, the termination control signal ODT_en can be generated to low level from the preamble period to the postamble period of the data strobe signal DQS. Moreover, because generating it by synchronizing the CAS latency with the internal clock signal rclk_d11, the termination control signal ODT_en is generated by being precisely synchronized with the data strobe signal DQS or a data input/output control signal.

When the pull-up and pull-down transistors' turn on/off of the termination circuit 300 is controlled by using the termination control signal ODT_en, the impedance of the termination circuit is adjusted in read and write operations, to be available to optimize the termination operation.

As described earlier, the present invention controls the termination circuit available to differentiate the impedance of the termination circuit, by generating a control signal during read and write operations, thereby to make it possible to perform the optimized termination operation. As a result, it can improve the operating characteristics of the circuit.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. An on-die termination control circuit, comprising:
   an output enable signal generator for sequentially generating a plurality of output enable signals of a single pulse by a predetermined interval;
   an output enable signal selector for selecting two signals among the plurality of output enable signals as first and second selected signals according to a column address strobe (CAS) latency and then outputting the first and second selected signals; and
   a termination control signal generator for generating a termination control signal which has different levels for read and write operations, respectively, according to the first and second selected signals.

2. The on-die termination control circuit of claim 1, wherein the output enable signal generator generates output enable signals, each having two clock cycles of pulse width, per each clock cycle.

3. The on-die termination control circuit of claim 1, wherein the output enable signal selector outputs the first and second selected signals by selecting two output enable signals having two-clock cycle interval among the output enable signals.

4. The on-die termination control circuit of claim 1, wherein the output enable signal selector includes:
   a first selector for outputting one of the output enable signals as the first selected signal; and
   a second selector for outputting an output enable signal faster than the output enable signal selected from the first selector by two clock cycles as the second selected signal according to the CAS latency.

5. The on-die termination control circuit of claim 1, wherein the termination control signal generator includes:
   a logic unit for outputting a high level signal when the first selected signal or the second selected signal is high level;
   a delay unit for synchronizing the high level signal of the logic unit with an internal clock signal; and
   a buffer unit for outputting an output signal of the delay unit as the termination control signal.

6. The on-die termination control circuit of claim 5, wherein the logic unit includes:
   a first inverter for inverting the first selected signal;
   a second inverter for inverting the second selected signal; and
   a NAND gate for receiving output signals of the first and second inverters.

7. The on-die termination control circuit of claim 5, wherein the delay unit outputs the high level signal of the logic unit according to the internal clock signal.

8. The on-die termination control circuit of claim 5, wherein the buffer unit inverts an output signal of the delay unit.

9. A method for generating an on-die termination control signal, comprising the steps of:
- sequentially generating a plurality of output enable signals in the form of one pulse;
- selecting two output enable signals, among the plurality of output enable signals according to a CAS latency; and
- generating a termination control signal which has different levels for a read operation and a write operation according to the two output enable signals selected by the CAS latency.

10. The method for generating an on-die termination control signal of claim 9, wherein the termination control signal is generated to a low level at a period that at least one of the two output enable signals is in a high level.

11. The method for generating an on-die termination control signal of claim 9, wherein the termination control signal is generated to a low level from a preamble period to a postamble period of a data strobe signal related with the read operation.

12. The method for generating an on-die termination control signal of claim 9, wherein the output enable signals are sequentially generated with a width of two clock cycles in every one clock cycle.

* * * * *